United States Patent [19]

DelMundo

[11] Patent Number: 4,916,027
[45] Date of Patent: Apr. 10, 1990

[54] PRIMARY STRUCTURE MULTI-LAYER INSULATION

[75] Inventor: Alfred R. DelMundo, Cerritos, Calif.

[73] Assignee: Rockwell International Corporation, El Segundo, Calif.

[21] Appl. No.: 146,661

[22] Filed: Jan. 21, 1988

[51] Int. Cl.[4] ............... B32B 15/18; B32B 15/20; B32B 15/01

[52] U.S. Cl. ............... 428/586; 52/799; 148/127; 220/445; 228/118; 228/181; 244/119; 244/123; 428/593; 428/649; 428/650; 428/660; 428/668

[58] Field of Search ............... 428/586, 593, 660, 649, 428/650, 668; 228/118, 181; 52/406, 799; 148/127; 220/441, 442, 443, 445; 244/119, 123

[56] References Cited

U.S. PATENT DOCUMENTS

| | | | |
|---|---|---|---|
| 2,212,481 | 8/1940 | Sendzimir | 228/118 |
| 2,333,343 | 11/1943 | Sendzimir | 228/118 |
| 2,786,004 | 3/1957 | Schwartz et al. | 52/406 |
| 3,200,489 | 8/1965 | Keeleric | 228/181 |
| 3,376,684 | 4/1968 | Cole et al. | 52/799 |
| 4,053,969 | 10/1977 | Bayard | 228/181 |
| 4,292,375 | 9/1981 | Ko | 244/119 |
| 4,703,159 | 10/1987 | Blair | 228/181 |

FOREIGN PATENT DOCUMENTS 18232 7/1979 Japan ..................... 228/181
2099740 12/1982 United Kingdom ............ 228/181

*Primary Examiner*—Robert McDowell
*Attorney, Agent, or Firm*—Charles T. Silberberg; Max Geldin

[57] ABSTRACT

A primary multi-layer structural component having insulation properties and the method of producing same is disclosed. The structure is comprised of opposing spaced apart face sheets, a plurality of internal core sheets, the core sheets being spaced apart from each other and from the face sheets. Truss means extend internally across the structure, the truss means being connected to and supporting the opposing face sheets, and being integrally connected to and supporting the core sheets. Such structure is produced by forming a stack of metal sheets in contact with each other, including a pair of outer face sheets and a plurality of core sheets positioned between the face sheets, and providing a predetermined stop-off pattern by placing stop-off material in certain preselected areas between the contacting surfaces of adjacent faces sheets and core sheets, and of adjacent core sheets. The stack of sheets is then subjected to diffusion bonding to cause bonding of adjacent sheets in areas other than the preselected areas containing stop-off material, and subjecting the diffusion bonded stack to superplastic forming to cause stretching of the core sheets in the unbonded areas containing stop-off material.

15 Claims, 1 Drawing Sheet

PRIMARY STRUCTURE MULTI-LAYER INSULATION

This invention was made with Government support under Contract No. F33657-86-C-2127 awarded by the United States Air Force. The government has certain rights in this invention.

BACKGROUND OF THE INVENTION

This invention relates to multi-layer metal structures having heat insulation characteristics, and is particularly directed to structural components of this class especially adapted for use in supersonic and hypersonic aircraft.

A major problem in the design of aircraft and aerospace structural components is the production of such components which will not only withstand the severe stress loads imposed by the speeds and altitudes of modern aircraft, particularly supersonic and hypersonic aircraft, but in addition to design structural components of this type which will also withstand the high thermal loads also imposed under these conditions.

Further, primary structural components of the above type heretofore produced have been of a relatively complex nature, requiring several stages for fabrication.

Illustrative of prior art metal structures are the following patents.

Kirk, et al U.S Pat. No. 3,029,910 discloses a composite structural unit for use as a metallic aircraft component in the form of a bead stiffened composite panel having an outer skin, an inner skin formed with beads to give the structure rigidity, a core material within the beads to further increase the structural rigidity and various strengthening edge members and doublers, all bonded together by a suitable bonding material. The structural component is assembled in several stages of assembly.

Shipley, et al U.S. Pat. No. 3,037,592 discloses a crisscross core for laminated metal structures which comprises a plurality of corrugated metal core elements assembled side-by-side in parallel alignment with the peaks of the corrugations of each element in contact with and secured to the valleys of the corrugations of adjoining core elements. Such metal structures are also fabricated in several stages.

The metal structures of the above-illustrated patents are basically employed as the primary structure, and no thermal insulation property is attributed to such structural components.

Thus, where insulation is required in conjunction with such structural members, a separate insulation member of non-structural characteristics is employed, in the nature of parasitic or passive insulation.

One object of the present invention is the production of a novel primary metal structure multi-layer insulation component.

Another object is to provide a multi-layer structural metal component having insulating characteristics particularly adapted for use in high speed aircraft, especially supersonic and hypersonic aircraft, and avoiding the need for a separate insulation member.

A still further object of the invention is the provision of a multi-layer metal structure produced by diffusion bonding and superplastic forming, wherein the intermediate layers of the structure are spaced from each other and form a reflective shield which carries the load and also acts as an insulator.

Yet another object of the invention is to provide efficient procedure for the fabrication of the aforementioned primary structure multi-layer metal insulation component of the invention.

SUMMARY OF THE INVENTION

A number of alloys exhibit superplasticity and are capable of being subjected to superplastic forming to produce parts of predetermined shapes. Superplasticity is the capability of a material to develop unusually high tensile elongation and to stretch with reduced tendency toward local necking during deformation. Prior to such superplastic forming, diffusion bonding of the metal workpieces is carried out to bond the workpieces in certain preselected areas, to permit superplastic forming to be carried out in the unbonded areas of the workpieces. This is accomplished by applying to adjacent contacting surfaces of the metal workpieces a so-called stop-off material such as yttria, boron nitride, graphite or alumina to prevent bonding at such treated areas during diffusion bonding, as known in the art.

Diffusion bonding refers to the solid-state metallurgical joining of surfaces of similar or dissimilar metals by applying heat and pressure for a time duration so as to effect surface contact and cause commingling of atoms at the joint interface.

According to the invention, a plurality of metal sheets, such as titanium, are assembled, with stop-off material placed in preselected locations between adjacent sheets, and the stack of sheets is then subjected to diffusion bonding and superplastic forming. By employing a unique stop-off pattern between the outer face sheets and the respective intermediate core sheets of the stack, after diffusion bonding and expansion of the sheets by superplastic forming, there is produced a unitary structure comprised of opposing spaced apart face sheets and a plurality of spaced apart internal core sheets, in which all of the sheets including the outer face sheets and the inner core sheets are bonded together by a regular geometric truss unit extending internally across the structure. Such unit can be in the form of like interconnected essentially V-shaped truss members, or in the form of an essentially sine wave configuration.

In the resulting unitary truss core structure, the truss component is essentially the load carrying structural core member and the intermediate interior sheets between the outer face sheets of the structure, which are integrally connected to the truss component, also have load carrying characteristics, but in addition function as reflective shield members which reflect heat. Thus, there is formed a structural member having interior reflective shields which have an insulating effect so as to preclude the necessity for requiring use of passive insulation material to provide heat insulation. The number of initial core sheets employed to produce the unique primary structure multi-layer insulation member of the invention can vary, depending on the load requirements and the thermal property of the materials employed.

The primary structure multi-layer insulation component of the invention can be fabricated in a single operation by diffusion bonding and superplastic forming. The layered intermediate core sheets serve as radiating heat shields, reflecting heat back toward the outer face sheet and reducing penetration of heat through the structure to the inner face sheet, and also serve to stabilize the truss core. This prevents direct heat passage through the panel. The design configuration of the multi-layer structural component of the invention can be tailored to absorb different types of loading, i.e. uniaxial or bi-axial, and can be designed simultaneously to minimize thermal loads, so that such component functions effectively as a primary structure and thermal protection system.

Thus, when employing the multi-layer unitary metal structure of the invention, instead of heat passing through the structure from the outer face sheet to the inner face sheet, the interior reflective shield members reflect heat back to the outer side of the structure and reduce the penetration of heat through the structure. This feature renders the multi-layer truss core structure or panel of the invention particularly adapted for use on hypersonic or supersonic aircraft as primary structural components wherever it is necessary to effect a temperature reduction through the structure. The invention structure eliminates or minimizes the need for added insulation on such aircraft, thus reducing structural weight and the total panel thickness for volumetric efficiency. The SPF/DB process employed for producing the primary structure of the invention is an essentially simple procedure and is less costly than presently employed processes for producing aircraft structural components.

The primary structure multi-layer insulated article of the invention can also be used as a multiple fuel barrier for fail safe fuel containment, which is a design criterion for aerospace vehicles. This is because the internal spaced reflective shield members in effect provide the double or multiple barrier criteria for a fuel tank. The invention structure thus can be employed for the production of an external tank on an aerospace vehicle, without employing a parasitic thermal protection layer outside the tank. The reflective shield members carry the load and simultaneously function as an insulator so that the outside skin of the tank corresponding to the outer face sheet of the structure can be hot, while the inside face sheet is at a much lower temperature. Thus the fuel in contact with the inside wall of the tank adjacent the inner face sheet is protected from the hot external temperatures at the outer face sheet without any added internal insulation.

The primary structure insulated multi-layer material of the invention in the form of a truss core structure with integral reflective shields can be tailored with respect to thickness of the interior shield members to resist loading, and such heat shield members can be corrugated in such a manner as to provide lateral support for the truss core. Also, the reflective interior shield members can be chemically milled to reduce the thickness of the members prior to diffusion bonding and superplastic forming, if desired.

The structural component of the invention can also be used, if desired, as a non-structural tile on the exterior of aerospace vehicles encountering high temperatures, to reduce erosion and ablation.

BRIEF DESCRIPTION OF THE DRAWINGS

The invention will be more readily understood from the detailed description below of the invention, taken in conjunction with the accompanying drawings wherein.

DETAILED DESCRIPTION OF THE PREFERRED EMBODIMENTS

Figure 1:
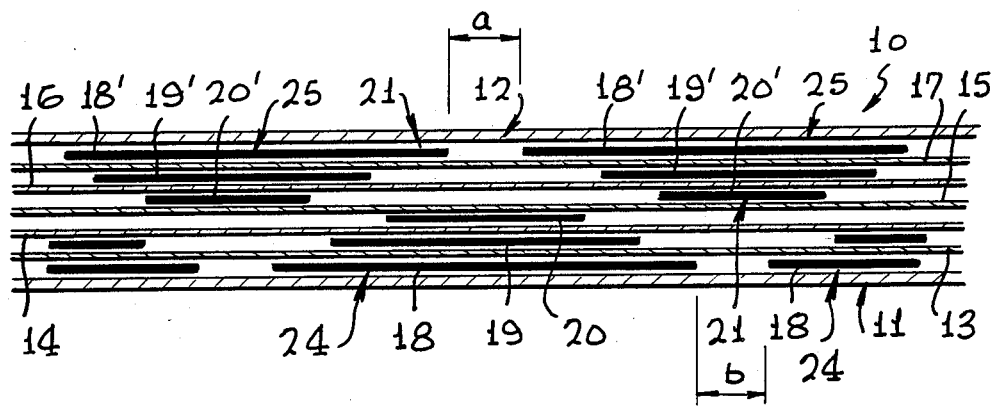
FIG. 1 is a sectional view of a stack of metal sheets having a preselected pattern of stop-off material between adjacent sheets, according to the invention.

Referring to FIG. 1 of the drawing, a plurality of metal sheets capable of diffusion bonding and superplastic forming, such as, for example, 6Al-4V titanium alloy, are placed in contact with each other to form a stack, indicated at 10. The stack of sheets consists of a pair of face sheets 11 and 12, with five core sheets 13, 14, 15, 16 and 17 between the face sheets. All of the sheets are in direct contact with the adjacent sheet or sheets.

A predetermined pattern 21 of stop-off material, such as yttria, boron nitride, graphite or alumina, is applied to the contacting surfaces of the sheets, such stop-off material being applied to the sheets prior to stacking, so that when the sheets are stacked, the stop-off pattern 21 will be formed, as shown.

The overall stop-off pattern 21 consists of consecutive opposed staggered pattern portions 24 and 25 of stop-off material which extend inwardly in each case from the face sheets 11 and 12, respectively. Stop-off pattern portions 24 each consists of a symmetric geometric pattern in the form of a long stop-off area 18 between face sheet 11 and the adjacent core sheet 13, a shorter length stop-off area 19 between adjacent core sheets 13 and 14, and a still shorter length of stop-off material 20 between adjacent core sheets 14 and 15.

The opposed adjacent complimentary stop-off pattern portions 25 each consists of a symmetric geometric pattern in the form of a long stop-off area 18' between face sheet 12 and the adjacent core sheet 17, a shorter length stop-off area 19' between adjacent core sheets 16 and 17, and a still shorter length of stop-off area 20' between adjacent core sheets 15 and 16.

It will be noted that the length of the stop-off areas 18', 19' and 20' of each of the stop-off pattern portions 25 are the same respectively as the length of the stop-off areas 18, 19 and 20 of each of the stop-off pattern portions 24.

Thus, it is seen that each of the stop-off pattern portions 24 and 25 are pyramid-shaped, commencing from the respective opposite face sheets 11 and 12, and terminate at the upper end of the pyramid at about the center of the stack of sheets 10.

Figure 2:
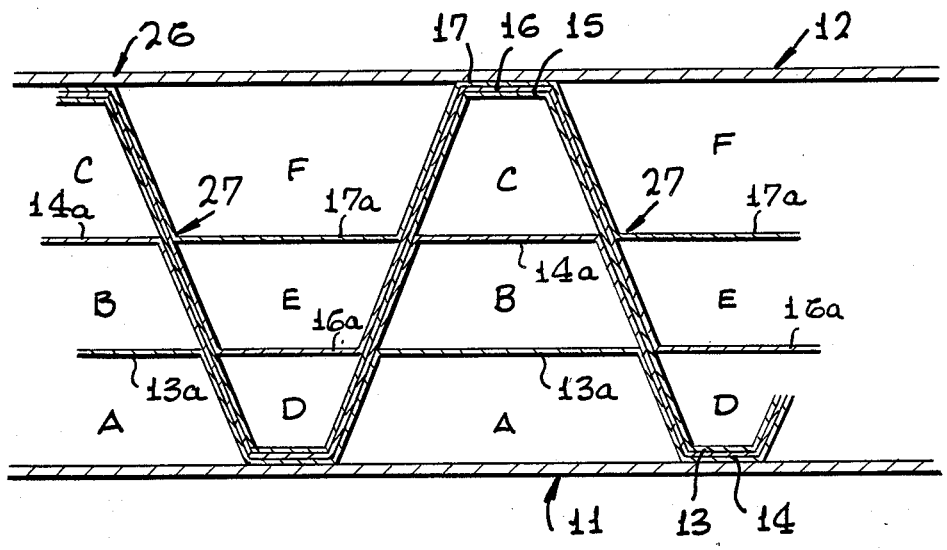
FIG. 2 is a sectional view of the multi-layer structural component of the invention, produced after diffusion bonding and superplastically forming the stack of sheets of FIG. 1.

Also, it will be noted that each of the consecutive pyramid-shaped stop-off pattern portions 24 overlaps symmetrically the two adjacent opposed pyramid-shaped stop-off pattern portions 25, and conversely each of the consecutive stop-off pattern portions 25 overlaps symmetrically the two adjacent opposed pyramid-shaped stop-off pattern portions 24, along the length of the sheet stack. Further, it will be seen that the length of the shortest stop-off area 20 of each of the consecutive stop-off pattern portions 24 is longer than the distance indicated at (a) between the longest stop-off areas 18' of the two adjacent opposed stop-off pattern portions 25, and similarly the length of the shortest stop-off area 20' of each of the consecutive stop-off pattern portions 25 is longer than the distance (b) between the longest stop-off areas 18 of the adjacent opposed stop-off area portions 24. The distances (a) and (b) can be substantially equal, and are otherwise known as node members. The term "node" denotes the bonded length of the face sheets 11 and 12, and the supporting truss members 27, following superplastic forming, as illustrated in FIG. 2.

Diffusion bonding between the adjacent sheets of the stack of sheets 10 can be accomplished by placing the stack of sheets in a press and heating the sheets to a suitable bonding temperature while pressure is applied to the sheets. Diffusion 16 bond temperatures can vary from 1450° F. to about 1900° F., e.g. about 1700° F. for 6Al-4V titanium alloy and bonding pressure can vary from about 100 psi to about 2,000 psi, usually from about 150 to about 600 psi. Instead of using press pressure, gas pressure can be employed. However, press pressure can be utilized if flat stack bonding of multiple parts is elected.

As result of the diffusion bonding operation, diffusion bonding of the adjacent sheets in the stack of sheets 11 to 17, occurs in those areas not containing stop-off material. Thus, adjacent sheets 11 and 13, and adjacent sheets 12 and 17 are bonded in the areas between adjacent stop-off areas or layers 18 and 18', respectively, adjacent sheets 13 and 14 and adjacent sheets 16 and 17 are bonded in the areas between adjacent stop-off layers 19 and 19', respectively, and adjacent sheets 14 and 15 and adjacent sheets 15 and 16 are bonded in the areas between adjacent stop-off layers 20 and 20', respectively. The adjacent sheets along the stop-off areas 18, 19 and 20, and 18', 19' and 20' remain unbonded.

After diffusion bonding of the stack of sheets as described above, the resulting bonded monolithic stack is then subjected to superplastic forming in the conventional manner. This is accomplished by placing the stack of diffusion bonded sheets in a forming apparatus, e.g. having an upper and lower tool. Passages are provided for introducing gas pressure into the assembly and into the unbonded stop-off areas between the diffusion bonded sheets. The bonded stack is superplastically formed under suitable temperature and pressure conditions. Superplastic forming in the unbonded areas of the adjacent sheets is carried out at pressures of about 200 to about 400 psi, e.g. about 300 psi, while heating the stack of sheets at approximately the same temperature employed for diffusion bonding, e.g. about 1700° F. for 6Al-4V titanium alloy.

The superplastic forming and diffusion bonding operations and the apparatus for carrying out such procedure are described in detail in U.S. Pat. No. 3,927,817. Such disclosure is incorporated herein by reference.

FIG. 2 illustrates in section, production of a multi-layer structural component obtained by superplastic forming of the diffusion bonded monolithic stack of sheets of FIG. 1. In producing such structure during superplastic forming, it will be seen that stretching of the core sheet 13 at the unbonded stop-off areas 18, away from face sheet 11 forms cavities A, stretching of the core sheet 14 at the unbonded stop-off areas 19, away from core sheet 13 forms cavities B and stretching of core sheet 15 at the unbonded stop-off areas 20, away from sheet 14 forms cavities C.

Similarly, stretching of the core sheet 17 at the unbonded stop-off areas 18', away from face sheet 12 forms cavities F, stretching of the core sheet 16 at the unbonded stop-off areas 19', away from core sheet 17 forms cavities E, and stretching of core sheet 15 at the unbonded stop-off areas 20', away from core sheet 16 forms cavities D.

The resulting structure produced following superplastic forming, indicated at 26 in FIG. 2, is a multi-layer truss core structure having both good structural and good insulating characteristics. Thus, there is connected to the opposite face sheets 11 and 12 and supporting same a plurality of essentially V-shaped integrally connected truss members 27 extending internally across and along the structure, such truss members integrally connected to and supporting the internal spaced longitudinally extending core sheets 13 and 14, and core sheets 16 and 17. The core sheets 13 and 16 in effect form a first reflective shield 13a, 16a spaced between face sheets 11 and 12, and the core sheets 14 and 17 in effect form a second reflective shield 14a, 17a between such face sheets, spaced from the first reflective shield, such reflective shields extending internally within the structure parallel to each other and parallel to the face sheets 11 and 12. Since superplastic forming utilizes pressure for forming, and the structural panel produced is gas tight, the entire structural panel can be evacuated or purged with dry air for more efficient insulating capability.

Thus, for example, where the primary structure multi-layer insulation component 26 of the invention is employed as a component adjacent the outer surface of an aerospace vehicle, due to the multi-layer insulation achieved by the internal reflective shields formed by the core sheets, heat from the outside environment and passing through the outer face sheet into the interior of the structure, will be reflected back by the reflective shields, substantially reducing the penetration of heat through the structure to the inner face sheet.

Thus, the structure of the invention can be employed particularly in the construction of an external fuel tank on a space vehicle, without using a parasitic insulation outside the tank. In the invention structure, the truss core in conjunction with the internal reflective shields carries the load, and the reflective shields in addition function as an insulator, and provide a multi-layer barrier for fuel containment. Thus, the outer face sheet of the multi-layer insulator construction forming the outer wall of the tank can be hot, while the inner face sheet is at a much lower temperature relative to the outside face sheet. If the fuel in the tank is disposed adjacent the inner face sheet of the structure, such fuel can be protected against a hot environment in contact with the outer face sheet, without added internal insulation. In addition, the inner face sheet can be arced, that is, formed of a plurality of arc shaped integrally connected members, to minimize thermal loads.

Various modifications of the invention can be made. Thus, the metal sheets of the stack of sheets which are diffusion bonded and superplastically formed to produce the structural insulation component of the invention can be formed of metals capable of diffusion bonding and superplastic forming other than titanium or its alloys, such as aluminum, aluminum alloys, titanium aluminide, superalloy materials such as iron-nickel alloys, beryllium, metal matrix composites including graphitealuminum composites, and copper coated graphite. However, the preferred metals are titanium alloys and aluminum alloys. Further, the core sheets and truss members can be made of a metal or metal alloy different from the face sheets. Thus, for example, the core sheets and truss members can be composed of one titanium alloy such as CP titanium alloy, and the face sheets of a different titanium alloy such as 6-4V titanium alloy.

It will be understood that the number of core sheets and the overall stop-off pattern can be arranged to vary the number of core sheets or internal reflective shields present in the multi-layer primary metal structure of the invention, the structure of the invention preferably comprising at least two spaced apart core sheets, e.g.

from 2 to 6 core sheets. Also, the thickness of the sheets can be varied to resist loading, and the reflective shields of the structure can be corrugated to provide greater lateral support, Further, if desired, the core sheets can be chemically milled to reduce thickness and weight.

From the foregoing, it is seen that the invention provides a unique primary structure combining structural strength and insulation properties, by the provision of internal reflective heat shields, and avoiding the use of passive insulation, produced by a process of diffusion bonding and superplastic forming, employing a unique stop-off pattern prior to diffusion bonding.

Since various further modifications of the invention will occur to those skilled in the art, within the spirit of the invention, the invention is not to be taken as limited except by the scope of the appended claims.

What is claimed:

1. A primary structure multi-layer load carrying and insulation member which comprises a diffusion bonded and superplastically formed metal truss core structure containing opposing spaced apart outer and inner face sheets, a plurality of internal core sheets, said core sheets being spaced apart from each other and from said face sheets, and truss means extending internally across the structure, said truss means comprising a plurality of integrally connected like truss members extending internally entirely across and along said truss core structure between said spaced apart face sheets, said truss members being integrally connected on opposite sides thereof to said opposing face sheets and integrally connected to and supporting said core sheets.

2. The structure of claim 1, said core sheets being reflective metal shield members, and capable of reflecting heat back toward the outer face sheet through which the heat penetrates the interior of the structure, thereby reducing the penetration of heat through the structure, to the inner face sheet.

3. The structure of claim 2, said reflective metal shield members extending longitudinally through the interior of the truss core structure, substantially parallel to each other and to said face sheets.

4. The structure of claim 3, said truss members being substantially V-shaped truss members.

5. The structure of claim 3, said face sheets being composed of one titanium alloy and said reflective shield members and said truss members being composed of another titanium alloy.

6. The structure of claim 1, wherein said face sheets, core sheets and truss means are composed of a material selected from the group consisting of titanium, aluminum, aluminum alloys, titanium alloys, superalloys, beryllium, metal matrix composites and copper coated graphite.

7. The structure of claim 1, said face sheets being composed of one metal and said core sheets and said truss members composed of another metal.

8. A process for producing a primary structure multi-layer insulation member which comprises forming a stack of metal sheets in contact with each other, including a pair of outer face sheets and a plurality of core sheets positioned between said face sheets, providing a predetermined stop-off pattern by placing stop-off material in certain preselected areas between the contacting surfaces of adjacent face sheets and core sheets, and between the contacting surfaces of adjacent core sheets, subjecting said stack of sheets to diffusion bonding to cause bonding of adjacent sheets in areas other than said areas containing stop-off material, subjecting said diffusion bonded stack to superplastic forming to cause stretching of said core sheets in the unbonded areas containing stop-off material, and forming a multi-layer truss core structure including opposing spaced apart face sheets, a plurality of internal core sheets, said core sheets being spaced from each other and from said face sheets by cavities formed during superplastic forming, and said core sheets forming reflective metal sheet members, and a plurality of integrally connected like truss members extending internally entirely across and along said structure between said spaced apart face sheets, said truss members being integrally connected on opposite sides thereof to said opposing face sheets and integrally connected to and supporting said core sheets.

9. The process of claim 8, wherein said face sheets, core sheets and truss members are composed of a material selected from the group consisting of titanium, aluminum, aluminum alloys, titanium alloys, superalloys, beryllium, metal matrix composites and copper coated graphite.

10. The process of claim 8, said diffusion bonding being carried out by press pressure bonding or gas pressure bonding at elevated temperature.

11. The process of claim 8, said superplastic forming being carried out by introduction of gas pressure into the unbonded stop-off areas between adjacent sheets while heating same to elevated temperature, to cause said stretching of the core sheets and formation of said cavities.

12. A process for producing a primary structure multi-layer insulation member which comprises forming a stack of metal sheets in contact with each other, including a pair of outer face sheets and a plurality of core sheets positioned between said face sheets, providing a predetermined stop-off pattern by placing stop-off material in certain preselected areas between the contacting surfaces of adjacent face sheets and core sheets, and between the contacting surfaces of adjacent core sheets, said stop-off pattern consisting of consecutive opposed staggered complimentary pattern portions between said face sheets, each said pattern portion consisting of a symmetric geometric pattern of stop-off areas of progressively decreasing length along said core sheets, extending inwardly from the respective face sheets, between each face sheet and the adjacent core sheet, and between a plurality of consecutive core sheets, subjecting said stack of sheets to diffusion bonding to cause bonding of adjacent sheets in areas other than said areas containing stop-off material, subjecting said diffusion bonded stack to superplastic forming to cause stretching of said core sheets in the unbonded areas containing stop-off material, and forming a multi-layer structure including opposing spaced apart face sheets, a plurality of internal core sheets, said core sheets being spaced from each other and from said face sheets by cavities formed during superplastic forming, and said core sheets forming reflective metal sheet members, and a plurality of integrally connected truss members extending internally across and along said structure, said truss members connected to said face sheets and integrally connected to said core sheets.

13. The process of claim 12, each of the stop-off pattern portions being pyramid-shaped, commencing from the respective opposing face sheets, and terminating at about the center of the stack of sheets.

14. The process of claim 13, each of the consecutive pyramid-shaped stop-off pattern portions extending inwardly from the respective face sheets, overlapping symmetrically the two adjacent opposed pyramid-shaped stop-off pattern portions along the length of the stack of sheets.

15. The process of claim 14, the length of the shortest stop-off area of each of the consecutive stop-off pattern portions being longer than the distance between the longest stop-off areas of the two adjacent opposed stop-off pattern portions.

* * * * *